US012409553B2

(12) United States Patent
Joly

(10) Patent No.: US 12,409,553 B2
(45) Date of Patent: Sep. 9, 2025

(54) SYSTEMS AND HYBRID POSITION FORCE CONTROL PROCESSES OF AN INDUSTRIAL ROBOT

(71) Applicant: STAUBLI FAVERGES, Faverges-Seythenex (FR)

(72) Inventor: Luc Joly, Faverges-Seythenex (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 242 days.

(21) Appl. No.: 18/126,371

(22) Filed: Mar. 24, 2023

(65) Prior Publication Data

US 2023/0302642 A1 Sep. 28, 2023

(30) Foreign Application Priority Data

Mar. 25, 2022 (FR) .................................. 2202707

(51) Int. Cl.
| | |
|---|---|
| B25J 9/16 | (2006.01) |
| B25J 9/12 | (2006.01) |
| B25J 13/08 | (2006.01) |
| B25J 18/04 | (2006.01) |

(52) U.S. Cl.
CPC ............. B25J 9/1664 (2013.01); B25J 9/126 (2013.01); B25J 9/1633 (2013.01); B25J 13/088 (2013.01); B25J 18/04 (2013.01)

(58) Field of Classification Search
CPC ........ B25J 9/1664; B25J 9/126; B25J 9/1633; B25J 13/088; B25J 18/04; B25J 9/16; B25J 9/1602; B25J 9/06; B25J 9/163; B25J 9/1638; B25J 13/08; G05B 2219/39322; G05B 2219/39319
See application file for complete search history.

(56) References Cited

PUBLICATIONS

Magrini, "Hybrid force/velocity control for physical human-robot collaboration tasks", 2016 IEEE?RJS International Conference on Intelligent Robots and Systems (IROS), IEEE, pp. 857-861, 2016.
Schreiber et al., "The Fast Research Interface for the KUKA Lightweight Robot", ICRA 2010 Workshop on Innovative Robot Control Architectures for Demanding (Research) Applications, pp. 15-21, 2010.
Raibert et al., "Hybrid Position/Force Control of Manipulators," Journal of Dynamic Systems, Measurement and Control, vol. 103, No. 2, 1981.

(Continued)

*Primary Examiner* — Adam R Mott
*Assistant Examiner* — Matthew C Gammon
(74) *Attorney, Agent, or Firm* — MARSHALL, GERSTEIN & BORUN LLP

(57) ABSTRACT

The present process of controlling an industrial robot includes steps consisting of calculating a time-dependent composite setpoint defining articular forces and/or velocities, according to a target trajectory and to an operating mode; calculating (S106) a behavior matrix which describes a desired behavior of the robot arm, defining directions along which the calculated composite setpoint is to be applied; calculating (S108) an articular force setpoint for controlling the axis controller module and calculating the time derivative of a homogeneous internal state at an articular position. The articular force setpoint for controlling the axis controller module is calculated from a control function which adjusts the difference between the articular position and the internal state determined by integrating said time derivative of the internal state.

16 Claims, 8 Drawing Sheets

(56) References Cited

PUBLICATIONS

Siciliano et al., "Chapter 9—Force Control—Robotics Modelling Planning and Control" In: "Robotics Modelling Planning and Control", pp. 363-406, Springer, 2009.
Natale et al., "Robust Hybrid Force/Position Control with Experiments on an Industrial Robot", Proceedings of the 1999 IEEE/ASME International Conference on Advanced Intelligent Mechatronics, pp. 956-960, 1999.
Search Report Issued in FR Patent Application No. 2202707, dated Nov. 25, 2022.

SYSTEMS AND HYBRID POSITION FORCE CONTROL PROCESSES OF AN INDUSTRIAL ROBOT

CROSS-REFERENCE TO RELATED APPLICATION

This application claims priority to French Patent Application No. 2202707 filed Mar. 25, 2023, the entire disclosure of which is incorporated by reference herein.

FIELD

The present invention relates to industrial robots, and more particularly relates to systems and processes for controlling an industrial robot which can be guided manually.

BACKGROUND

Industrial robots, such as robot arms, are increasingly used in direct operator collaboration applications, wherein operators can act directly on the robot. Such is e.g. the case of surgical applications, or of certain industrial manufacturing processes, among others.

The operator can e.g. act directly on the robot by manipulating and moving a part of the robot arm. Such motion is detected by sensors of the robot. Depending on such feedback, the robot control system accordingly modifies setpoints sent to the robot motors, e.g. to bring or hold the robot arm at the position chosen by the operator, or to accompany a manual movement of the robot by the operator.

Generally, the performance of a robot's "manual" guiding can be measured by different criteria, such as the ease with which the robot can be moved (transparency), the absence of elasticity under the action of the operator (rigidity) and stability, which is evaluated when the robot reaches a limit position imposed by programming or by the user.

None of the robot control solutions available and known at the present time can achieve results which meet the three criteria, which are often difficult to reconcile.

Indeed, in practice, a robot with satisfactory rigidity and transparency will have insufficient stability, because the robot will be subject to bounces when coming into contact with a rigid element of the environment thereof effect under the action of an operator.

There is thus a need for systems and processes for controlling industrial robots which use guiding with improved performance when the robot has to be at least partially guided manually.

SUMMARY OF THE INVENTION

According to another aspect, the invention relates to a control process for an industrial robot, the robot including:
a multi-axis robot arm comprising at least two electric actuators each apt to movie a part of the robot arm relative to another part of the robot arm about or along an axis of movement, each electric actuator being associated with a sensor configured for measuring an articular position of the corresponding actuator,
a robot control system including axis controller module configured for calculating the control setpoints of power units which deliver an appropriate electric current to the actuators according to an articular force setpoint and a calculation module configured for determining articular force setpoints for the axis controller module, the calculation module being coupled to the axis controller module,
wherein the control process includes the steps of:
calculating a time-dependent composite setpoint defining articular forces and velocities, according to a target trajectory and to an operating mode,
calculating a behavior matrix which describes a desired behavior of the robot arm, defining directions along which the calculated composite setpoint is to be applied, the behavior matrix being expressed in the articular space,
calculating an articular force setpoint for controlling the axis controller modules and a calculation of a time derivative of a homogeneous internal state at an articular position and distinct from the measured articular positions, the calculation of the articular force setpoint for controlling the axis controller modules and of the time derivative each being performed according to the previously calculated composite setpoint, the previously calculated behavior matrix, the measured articular positions, articular velocities derived from measured articular positions, and the previously calculated internal state,
wherein the articular force setpoint for controlling the axis controller module is calculated from a control function which adjusts the difference between the articular position and the internal state, the internal state being determined by integrating said time derivative of the internal state.

In some embodiments, the control function is a proportional-integral-derivative controller.

In some embodiments, the articular force setpoint and the time derivative of the internal state are solutions of the following system of differential equations:

$$\begin{cases} \dot{q}_{mv} = u - Y\left(K_p(q_{mv} - q_r) + K_i \int (q_{mv} - q_r)dt - K_d \dot{q}_r\right) \\ \tau = K_p(q_{mv} - q_r) + K_i \int (q_{mv} - q_r)dt + K_d(\dot{q}_{mv} - \dot{q}_r) \end{cases}$$

where $q_{mv}$ is the function corresponding to said internal state, $\dot{q}_{mv}$ is the time derivative of the internal state $\tau$, is the articular force setpoint, Y is the behavior matrix and u is said composite setpoint and where Kp, Ki and Kd are gains, and Ki and/or Kd are gain matrices.

In some embodiments, the electric actuators include brushless electric motors and the axis controller modules are configured for calculating the power current to the actuators according to the articular position thereof as measured by the corresponding sensor.

In some embodiments, the axis controller module takes into account the forces measured by a multi-axis force sensor for calculating the control setpoints for the power units according to the articular force setpoint.

In some embodiments, the robot includes an effector placed at the end of the robot arm and the calculation module includes a gravity compensator which calculates the weight of the effector and a Cartesian articular converter which calculates the conversion matrix from the articular positions and sends the weight of the effector and the articular conversion matrix to the axis controller module for taking into account the multi-dimensional external forces measured by a force sensor mounted at the end of the robot arm.

In some embodiments, the calculation module calculates the composite setpoint and the behavior matrix with a first frequency and calculates the articular force setpoints for controlling the axis controller module with a second frequency higher than the first frequency.

In some embodiments, the second frequency is between two and twenty times higher than the first frequency, preferentially between five and ten times higher than the first frequency, even more preferentially eight times higher than the first frequency.

In some embodiments, the calculation module includes a gravity compensator which calculates the weight of the effector and a Cartesian articular converter which calculates the articular conversion matrix from the articular positions and sends the weight of the effector and the conversion matrix to the axis controller module for taking into account the forces measured, at the first frequency, by a multi-axis force sensor mounted at the end of the robot arm.

In some embodiments, a central unit implements the calculation of the composite setpoint and the behavior matrix and wherein an auxiliary unit implements the calculation of the articular force setpoints and the axis controller module, the central unit and the auxiliary unit being in communication by means of a data bus.

In some embodiments, the electric actuators include brushless electric motors and a central unit implements the calculation of the composite setpoint and the behavior matrix, the calculation of the articular force instructions and the calculation of the current loop setpoints for controlling current loops by force and velocity loops and a plurality of amplifiers in communication with the central unit are apt to supply current to the motors according to the setpoints for controlling current loops.

In some embodiments, the calculation of the composite setpoint and the behavior matrix takes into account the internal state.

According to another aspect, the invention relates to a control system for an industrial robot, the robot including:
a multi-axis robot arm comprising at least two electric actuators each apt to movie a part of the robot arm relative to another part of the robot arm about or along an axis of movement, each electric actuator being associated with a sensor configured for measuring an articular position of the corresponding actuator,
a robot control system including axis controller modules configured for calculating the control setpoints of power units which deliver an appropriate electric current to the actuators according to an articular force setpoint and a calculation module configured for determining articular force setpoints for the axis controller module, the calculation module being coupled to the axis controller module,
the control system including modules configured for:
calculating a time-dependent composite setpoint defining articular forces and velocities, according to a target trajectory and to an operating mode,
calculating a behavior matrix which describes a desired behavior of the robot arm, defining directions along which the calculated composite setpoint is to be applied, the behavior matrix being expressed in the articular space,
calculating an articular force setpoint for controlling the axis controller modules and a calculation of a time derivative of a homogeneous internal state at an articular position and distinct from the measured articular positions, the calculation of the articular force setpoint for controlling the axis controller modules and of the time derivative each being performed according to the previously calculated composite setpoint, the previously calculated behavior matrix, the measured articular positions, articular velocities derived from measured articular positions, and the previously calculated internal state,
wherein the articular force setpoint for controlling the axis controller module is calculated from a control function which adjusts the difference between the articular position and the internal state, the internal state being determined by integrating said time derivative of the internal state.

According to another aspect, the invention relates to an industrial robot including such a control system of an industrial robot, adapted to implement a control process as described.

BRIEF DESCRIPTION OF FIGURES

The invention will be better understood and other advantages thereof will appear more clearly in the light of the following description, given only as an example and made with reference to the enclosed drawings, wherein.

DETAILED DESCRIPTION

Figure 1:
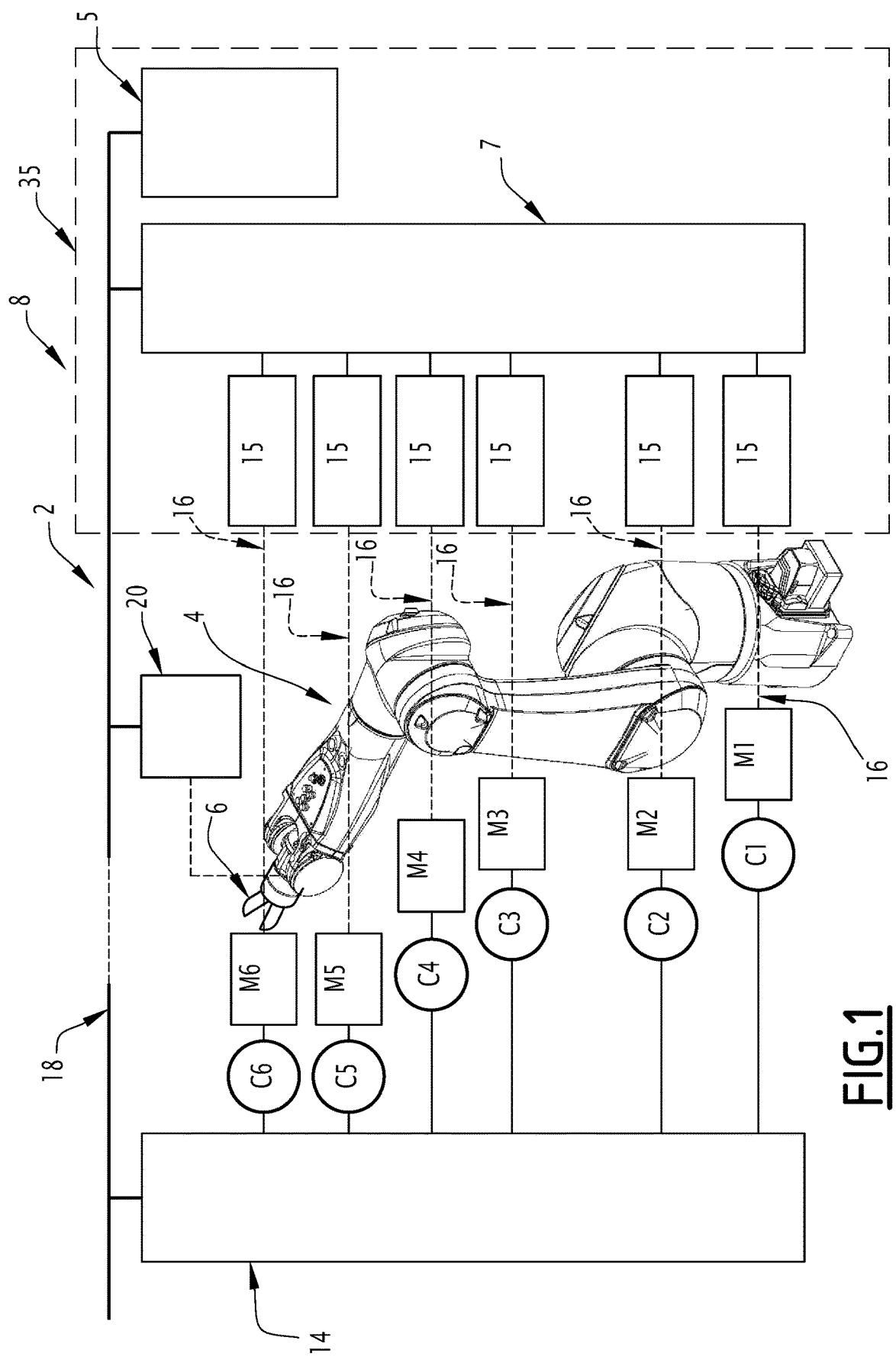
FIG. 1 shows schematically and in structural blocks, an industrial robot according to the invention as per a first embodiment.

FIG. 1 shows an example of an industrial robot 2.

The robot 2 includes a multi-axis robot arm 4. The robot arm 4 includes e.g. a plurality of segments articulated in pairs about axes of rotation.

The robot arm 4 can comprise an effector 6, such as a controllable tool, which is placed at the end of the robot arm 4.

The robot arm 4 includes a plurality of electric actuators, denoted by M1, M2, M3, M4, M5 and M6 in the example shown in FIG. 1 (and denoted hereinafter by M1 to M6). Each of the electric actuators is apt to rotate or translate a portion of the robot arm 4 with respect to another part of the robot arm 4 about an axis of movement, such as one of the axes of rotation.

Each electric actuator M1 to M6 includes an electric motor, such as synchronous brushless electric motors, or any other suitable electric motor.

The robot 2 further includes a plurality of sensors, denoted by C1, C2, C3, C4, C5 and C6 in the example shown in FIG. 1 (and denoted hereinafter by C1 to C6).

Each electric actuator M1 to M6 is associated with a sensor C1 to C6. Each sensor C1 to C6 is configured for measuring an articular position of the electric actuator. Sensors C1 to C6 e.g. are angle sensors, such as rotary encoders. The articular position corresponds e.g. to an angular position of the articulation.

Preferentially, the robot 2 is a 6-axis robot. The robot arm 4 thus has six degrees of freedom and includes six electric actuators M1 to M6 and six sensors C1 to C6.

The robot 2 further includes a control system 8.

Figure 2:
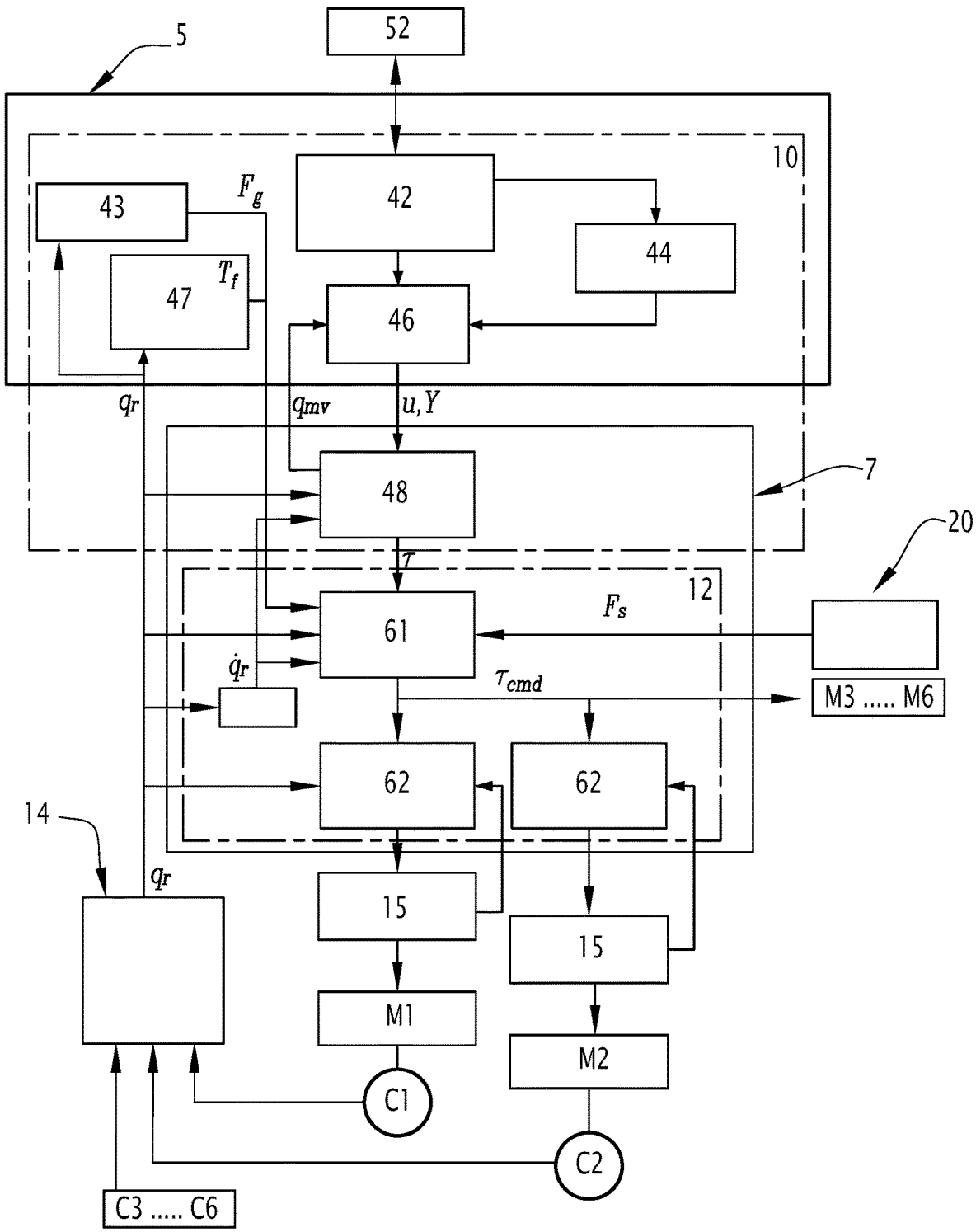
FIG. 2 is a functional block diagram of the industrial robot shown in FIG. 1 according to the first embodiment.
Figure 3:
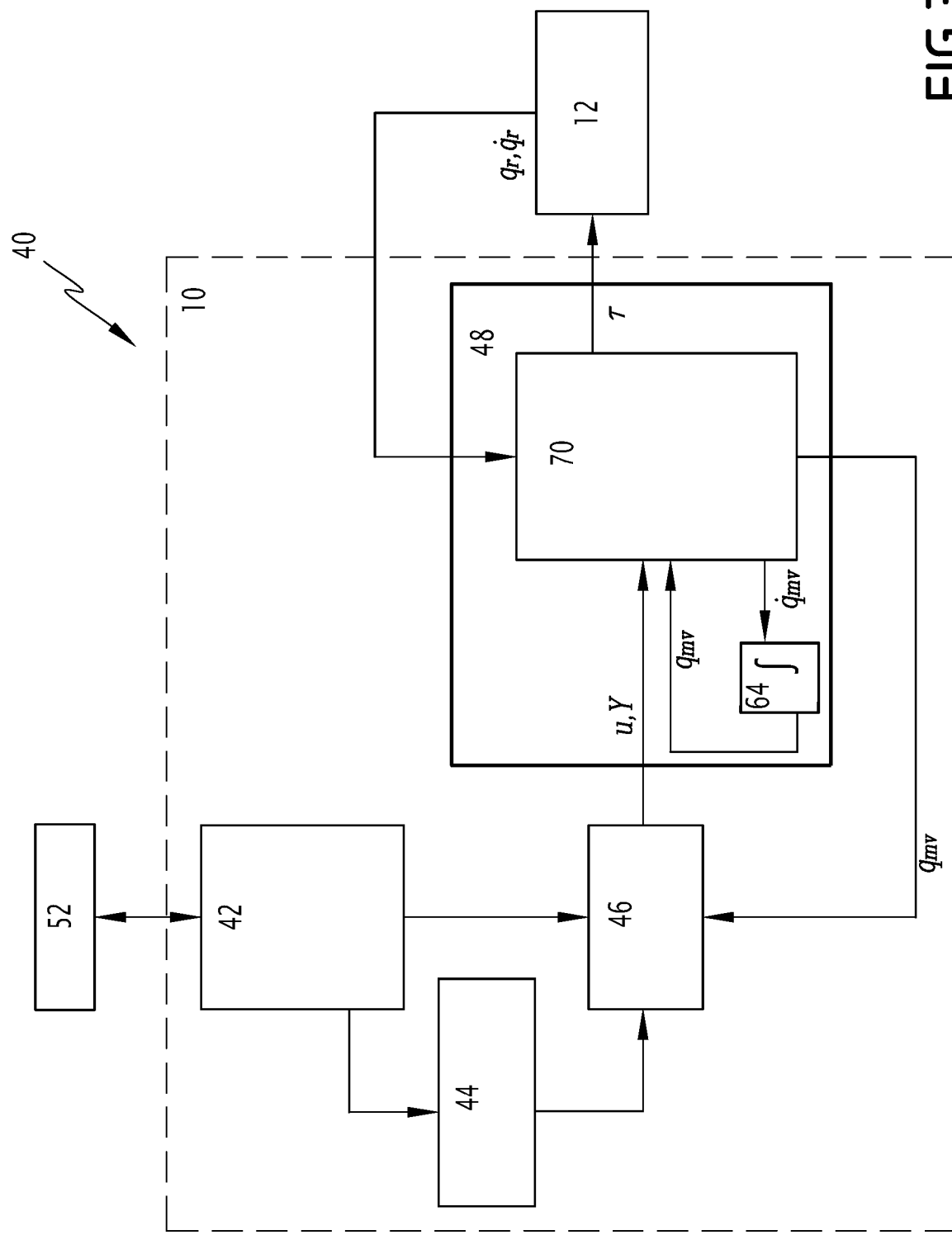
FIG. 3 is a synthetic block diagram illustrating the control system according to the invention.

In a first embodiment shown in FIGS. 1, 2 and 3, the control system 8 includes:
- a central unit 5,
- an auxiliary unit 7 and
- 6 power units 15.

As defined in the present description, the term "articular" refers to either the (angular) position of each articulation of the robot arm 4, or to the current (angular) position of each actuator M1 to M6 of the robot. The expression "articular forces" refers to the forces controlled on each articulation of the robot arm, or on each actuator M1 to M6.

Conventionally, a spatial position is defined either in a Cartesian space or in the articular space, wherein the articular positions of each articulation of the robot arm are expressed.

In the description, the term "force" refers to a mechanical force or torque.

The central unit 5 is in communication with the auxiliary unit 7 via a data link such as a data bus 18, in particular a field bus.

In practice, the auxiliary unit 7 is electrically connected to power units 15 which deliver, via electrical conductors 16, an appropriate electric current to the actuators M1 to M6.

The power unit 15 is a device comprising controllable switches coupled to a power supply and apt to generate the currents in the phases of a motor according to control signals from the switches called power unit control setpoints. The device comprises sensors for measuring the phase currents of the motors. Such current measurements are sent to the servo-control so as to adapt, through feedback, the control of the controllable switches of the power unit 15.

The control system 8 further includes a data acquisition interface 14, such as an electronic card. The data acquisition interface 14 is connected to the sensors C1 to C6 and is configured for receiving data measured by the sensors C1 to C6.

The sensors C1 to C6 e.g. are connected to an acquisition interface 14 by communication links compatible with an industrial communication protocol, such as the EnDat protocol, or an equivalent protocol.

The data acquisition interface 14 is connected to the central processing unit 5 and to the auxiliary unit 7 by a data link such as a data bus 18, in particular a field bus.

Preferentially, the data bus 18 is compatible with the EtherCAT (Ethernet for Control Automation Technology) communication protocol.

The constituents of the control system 8 can advantageously be grouped together in a control cabinet. Alternatively, the data acquisition interface 14 can be placed in the robot arm, like the actuators M1 to M6 and the sensors C1 to C6. The central unit 5, the auxiliary unit 7 and the power units 15 can be placed in a control cabinet 35 shown in dotted lines in FIG. 1.

Optionally, a multi-axis force sensor 20 placed between on the robot arm 4 can be connected to the central unit 5 and to the auxiliary unit 7, e.g. via the data bus 18.

Preferentially, the multi-axis force sensor 20 is placed between the end of the robot arm 4 and the effector 6. Preferentially, the multi-axis force sensor 20 consists of at least 6 measuring devices, e.g. piezo-resistive strain gages rigidly attached to a test body. The geometrical arrangement of the devices, not necessarily aligned with a canonical Cartesian reference system, can be used for reconstructing the complete force screw by linear combination of the measurements same produces. The multi-axis force sensor 20 is configured for providing the multi-dimensional external forces $F_s$.

In some variants, however, the external forces exerted on the robot arm could be determined by measuring the currents of the actuators. The function of the multi-axis force sensor 20 could then be replaced by an analysis module electronically used by the control system 8.

Figure 7:
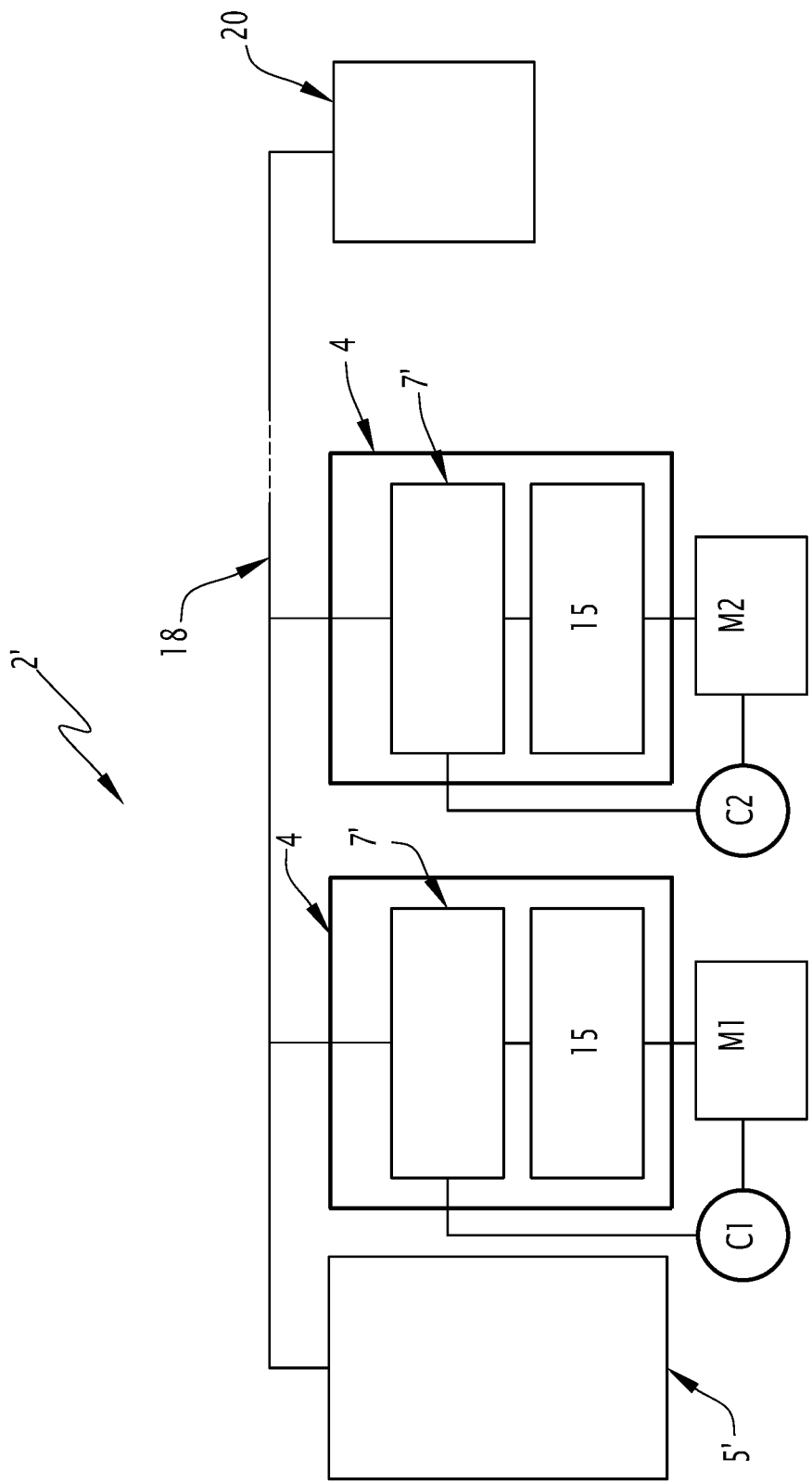
FIG. 7 is a functional block diagram of the industrial according to a second embodiment.

In a second embodiment, partially illustrated in FIG. 7 with reference to an industrial robot 2' which is analogous to the industrial robot 2, the control system 8 includes a central unit 5' and 6 amplifiers 4. The central unit 5 is in communication with the amplifiers 4 via a data link such as a data bus 18, in particular a field bus.

Each amplifier 4 is connected to only one of the actuators M1 to M6 and to only one of the sensors C1 to C6 (in the present case, to the sensor which is associated with said actuator). Each amplifier 4 includes an auxiliary unit 7' and a power unit 15. Each amplifier 4 is thus connected to the corresponding actuator M1 to M6 via a power unit 15 as described hereinabove.

To simplify FIG. 7, only the first two amplifiers 4 are illustrated, being associated with the actuators M1 and M2 and with the sensors C1 and C2, respectively.

Figure 4:
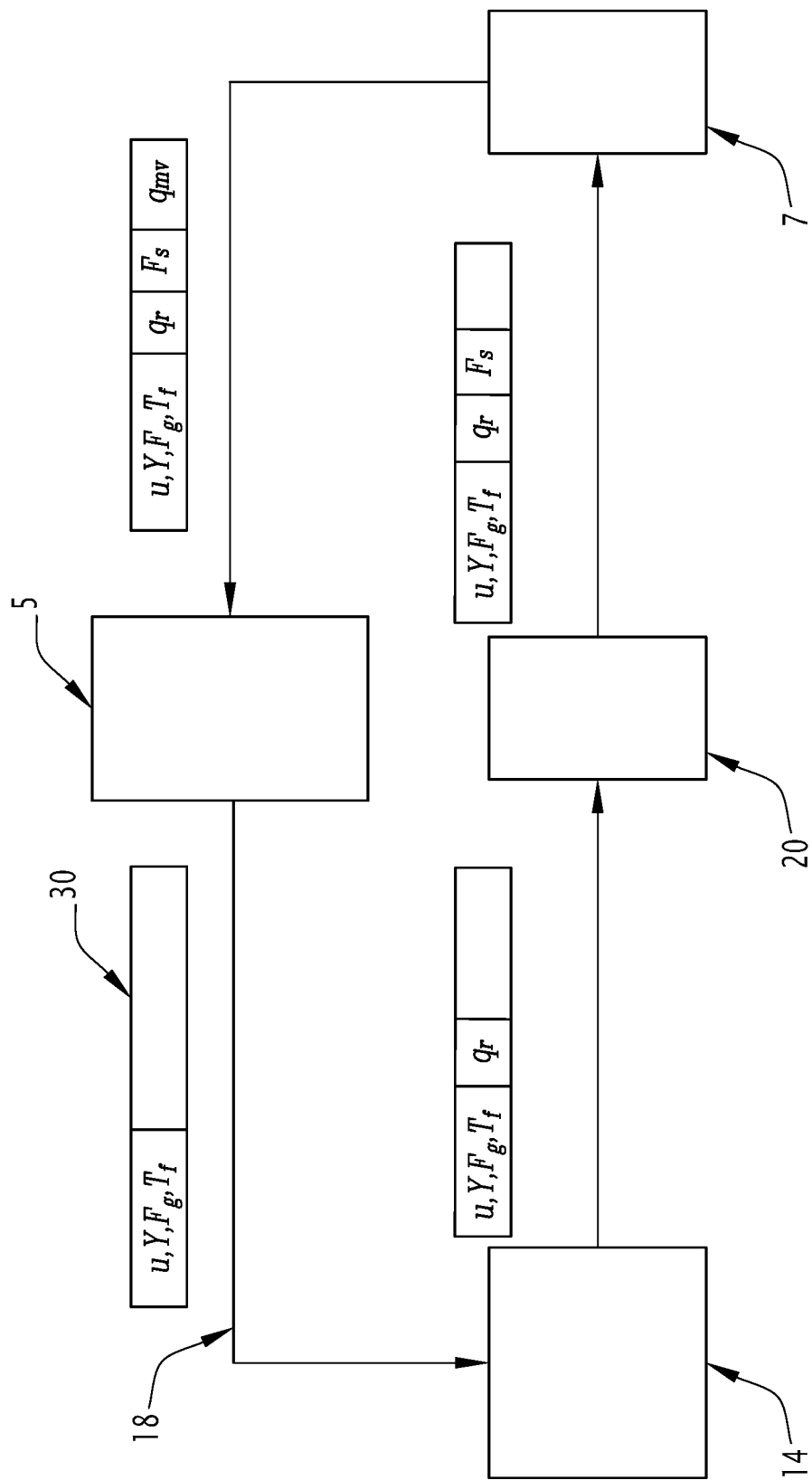
FIG. 4 is a block diagram illustrating data communication between robot units.

In the different embodiments, as illustrated in the example shown in FIG. 4 the data bus 18 enables the different equipment such as the central unit, the auxiliary unit, the data acquisition interface 14 and the multi-axis force sensor 20 to communicate by circulating data frames 30 sent synchronously or cyclically.

Preferentially, the communication is carried out one-way, yet making cross-communication possible.

The central processing unit e.g. acts as a "master" on the data bus and the other connected equipment act as "slaves". The "slave" equipment can read the data contained in each data frame and add data to the data frame during the passage of the latter, the data frame being fed back to the central unit at the end of each communication cycle.

As illustrated in FIG. 4 and for the first embodiment, the central unit 5 sends a data frame 30 which reaches first the data acquisition interface 14. The data acquisition interface 14 completes the data frame 30 with data such as e.g. the articular positions $q_r$ of the actuators M1 to M6. The data frame then reaches the multi-axis force sensor 20. The multi-axis force sensor 20 supplements the data frame with the measured multi-dimensional external forces $F_s$. The data frame 30 then reaches the auxiliary unit 7 which can read the articular positions $q_r$ of the electric actuators M1 to M6 and the measured multi-dimensional external forces $F_s$ which have just been written into the data frame 30. The data frame 30 then reaches the central unit 5 which can read the articular positions $q_r$ of the electric actuators M1 to M6 and the measured multi-dimensional external forces $F_s$. In a variant, the central processing unit 5 can implement cyclic communications at different frequencies. Certain data frames 30 sent at high frequency can be dedicated to communicating the articular positions $q_r$ of the electric actuators M1 to M6, while certain data frames 30 sent at a lower frequency can be dedicated to communicating the measured multi-dimensional external forces $F_s$.

Such an operation is particularly advantageous in communication processes compatible with the EtherCAT (EtherCAT Automation Protocol) protocol.

FIG. 3 specifies the way the robot 2 is controlled by the control system 8. In FIG. 3, the control functions of the robot 2 are represented by a simplified block diagram 40, only the functions essential to the understanding of the invention being illustrated and described in detail.

The control system 8 implements an application program execution module (module 42), a trajectory generator (module 44) and an impedance manager (module 46).

The application program execution module 42 addresses instructions to the trajectory generator 44, e.g. in the form of asynchronous controls.

The application program execution module 42 can also be used for selecting the appropriate operating mode for the impedance manager 46. A mode of operation under force control e.g. can be chosen, or a mode of operation under position control, or a hybrid mode of operation mixing force control and position control, or a mode of operation under impedance control.

The application program execution module 42 can also return status information to a user.

The trajectory generator 44 receives high-level instructions (e.g., an instruction to move in a straight line to a given destination in space) and transforms the instructions into a succession of articular or Cartesian positions, e.g. by applying a kinematic model associated with the robot arm 4 and, where appropriate, by taking mechanical constraints into account such as reduction gears and any mechanical couplings.

The trajectory generator 44 can also, in a similar way, generate force trajectories (such as a force in a given direction changing progressively from one value to another). Preferentially, the position and force trajectories are synchronized.

The impedance manager 46 generates the articular controls so as to give the robot a defined behavior, e.g. to follow a trajectory in a Cartesian space.

Such controls are preferentially generated using operating mode information supplied by the application program execution module 42, but also and above all according to movement setpoints (such as positions and velocities) and/or synchronous force setpoints, and according to a quantity, denoted by $q_{mv}$, which will be described in greater detail hereinafter.

The articular controls generated by the impedance manager 46 comprise a composite force and/or velocity setpoint, denoted by "u", and a behavior matrix, denoted by Y. Y is e.g. a square matrix of dimension n, and u is a vector of dimension n, n being the number of actuators of the robot. The behavior matrix Y describes a desired behavior of the robot arm, defining directions wherein the composite setpoint u is to be applied. The coefficients of the behavior matrix Y can be time-dependent functions. Similarly, the composite setpoints u can depend on time.

In a variant, the composite setpoints u could be separated into two distinct variables: a velocity setpoint on the one hand and a force setpoint on the other hand. However, grouping same into a single variable limits data exchange between components in the physical implementation.

In the present description, the term "impedance" refers to the mechanical impedance of the robot arm 4. Indeed, one of the aims of the control method is to control the behavior and the response of the robot arm 4 when same is subject to external forces, e.g. when same encounters an obstacle or when a user exerts a manual force on the robot arm (e.g. for guiding the robot manually).

The mechanical impedance of the robot characterizes the response of the robot arm 4 to an external mechanical force. A zero (or near-zero) impedance means that the robot moves freely as soon as an attempt is made to apply a force on the robot. An infinite (or very large) impedance means that the robot arm remains stationary regardless of the external force applied. The impedance of the robot can be chosen differently for different directions in space, e.g. by selecting a very high impedance in certain directions and a low impedance in other directions.

In general, the control system 8 of the robot is configured for calculating the time-dependent composite setpoint u defining articular forces and velocities, according to a target trajectory and a chosen mode of operation, and for calculating the behavior matrix Y which describes a desired behavior of the robot arm, defining directions wherein the calculated composite setpoint u is to be applied. Such calculation is repeated cyclically.

The control system 8 further includes an articular impedance controller (module 48) which receives the composite setpoint u and the behavior matrix Y generated by the impedance manager 46, as well as the articular position and velocity of the robot (respectively denoted by $q_r$ and $\dot{q}_r$) obtained from sensors the C1 to C6.

On the basis of such information, the articular impedance controller 48 is configured for generating the articular force setpoints (denoted by "τ") so that the robot follows the behavior defined by the composite setpoint u and the behavior matrix Y generated by the impedance manager 46. In addition, the articular impedance controller 48 generates and/or updates the quantity $q_{mv}$, which corresponds to an internal state comparable to an internal and virtual articular position setpoint, but different from the actual articular position $q_r$, which will be used for calculation purposes.

The control system 8 finally includes an axis controller module 12.

The axis controller module 12 implements one or a plurality of control loops which control the actuators so that the forces applied follow the articular force setpoint τ received from the articular impedance controller 48. The axis controller module 12 comprises force and velocity loops 61 which provide force and velocity control and generate the current loop control setpoints $\tau_{cmd}$ which can take into account the gravity compensations of the robot arm 4 and of the effector 6. The articular velocity $\dot{q}_r$ is obtained e.g. by numerical differentiation of the position $q_r$ of the robot. In practice, the position and the articular velocity of the robot ($q_r$ and $\dot{q}_r$) as well as all the articular forces, can have the form of vectors the coefficients of which correspond to the different articulations or actuators.

In summary, the robot control system is thereby configured for calculating an articular force setpoint τ for controlling the axis controller modules and the time derivative $\dot{q}_{mv}$ of a homogeneous internal state $q_{mv}$ at an articular position, yet distinct from the actual articular position $q_r$, such calculation being performed according to said previously calculated composite setpoint u, said previously calculated behavior matrix Y, said measured articular positions $q_r$, articular velocities 4, derived from the measured articular positions $q_r$, and the internal state $q_{mv}$.

The robot 2 advantageously includes a human-machine interface 52 (HMI) for acquiring controls and instructions coming from a user and for displaying or sending information to the user, such as information on the internal state of the robot 2 and/or on operating parameters.

The control system 8 of the robot implements a calculation module 10 which incorporates the functions of the modules 42, 44, 46 and 48. The calculation module 10 is apt to generate the articular force setpoints T for controlling the axis controller module 12. The axis controller module 12 is apt to calculate the control setpoints for power units 15 which deliver an appropriate electric current to the motors M1 to M6.

For the first embodiment, FIG. 2 can be used for describing how the calculation module 10 and the axis controller module 12 are implemented. The central unit 5 and the auxiliary unit 7 each include at least one processor, such as a programmable microcontroller or a microprocessor, which is coupled to a computer memory which includes executable instructions and/or a software code intended to implement a process for controlling the robot when the instructions are executed by the processor. The central processing unit 5 is apt to operate the functions of the modules 42, 44 and 46. The central processing unit 5 communicates to the auxiliary unit 7, via the data bus 18, the composite setpoint u and the behavior matrix Y. The auxiliary unit 7 is apt to operate the functions of the module 48, i.e. of the articular impedance controller which calculates the articular force setpoints T and sends same to the axis controller module 12 which implements force and velocity control loops 61 and current control loops 62. The auxiliary unit 7 is also apt to operate the functions of the axis controller module 12. The auxiliary unit 7 is connected to the 6 power units 15 and thus sends power unit control setpoints to same. For the clarity of FIG. 2, only two of the six power units 15 are shown.

Figure 8:
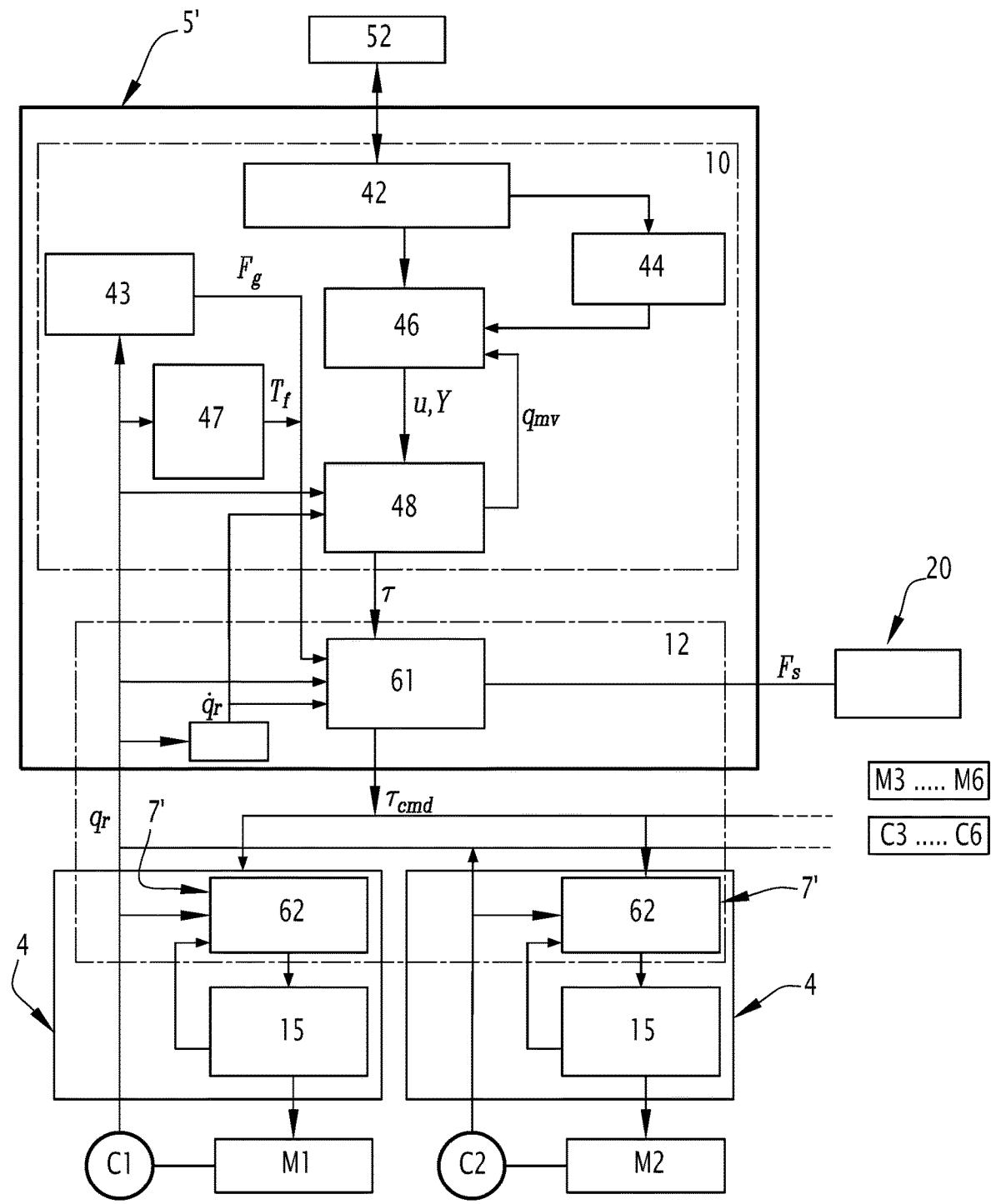
FIG. 8 is a functional block diagram of the industrial robot shown in FIG. 7 according to a second embodiment.

For the second embodiment, FIG. 8 can be used for describing how the calculation module 10 and the axis controller module 12 are implemented. The central unit 5' and the auxiliary units 7' each include at least one processor, such as a programmable microcontroller or a microprocessor, which is coupled to a computer memory which includes executable instructions and/or a software code intended to implement a process for controlling the robot when the instructions are executed by the processor. The central unit 5 is apt to operate the functions of the modules 42, 44, 46, 48 and 61. Unlike the first embodiment, same operates with the functions of the module 48, i.e. the articular impedance regulator which calculates the articular force setpoints τ. The central unit 5' communicates to the auxiliary units 7', via the data bus 18, the setpoints for controlling current loops $\tau_{cmd}$. The auxiliary units 7' are apt to implement current control loops 62. Each amplifier 4 includes an auxiliary unit 7' and a power unit 15. An amplifier is comparable to a commercially available axis amplifier. In the second mode, the axis controller module 12 is implemented in the auxiliary units 7' and partially in the central unit 5' which implements force and velocity loops 61.

In both embodiments, the articular force servo-control can be implemented by the axis controller module 12 according to well-known common control strategies, which are not described in more detail, the essential thing being that the forces exerted on each of the articulations of the robot comply well with the calculated articular force setpoint τ.

In practice, it is advantageously possible to use force servo-control of the robot based on current servo-control of each of the actuators M1 to M6, the current servo-control being performed by the current loop 62, for each actuator M1 to M6, according to the angular position information from the sensor C1 to C6 associated with the actuator M1 to M6 and to the measurement of the currents of the power units 15.

In many cases, the force servo-control provided by the force and velocity loop 61 can further include a correction aimed at compensating for the gravity and friction of the robot arm, the correction of frictions being calculated for each articulation from the velocity of rotation determined for the articulation, the gravity being calculated for each articulation from the angular position and the dynamic model of the robot arm 4.

In certain cases, when the multi-axis force sensor 20 is used, a correction is made to the servo-control strategy depending on the forces and/or torques measured by the multi-axis force sensor 20. Different correction strategies can be implemented depending on whether a multi-axis force sensor is mounted at the end of the robot arm, or depending on whether a plurality of force sensors are associated with the respective articulations of the robot arm 4.

When a multi-axis force sensor 20 is placed between the end of the robot arm and the effector 6, the calculation module 10 then includes a gravity compensator 43 which calculates the weight of the effector $F_g$. The weight of the effector $F_g$ is a vector representing the force screw of the weight of the effector 6, expressed in the reference frame of the multi-axis force sensor 20. Same is calculated from the parameters of the tool carried by the robot (mass, position of the center of gravity), the geometric model of the robot arm and the articular positions measured $q_r$. The weight of the effector $F_g$ is subtracted from the measurement of the multi-axis force sensor 20 at the force and velocity loops 61 so as not to take into account the weight of the effector in the control, but only the forces exerted on the effector 6. The calculation module 10 further includes an articular Cartesian converter 47 which calculates the articular conversion matrix $T_f$. The articular conversion matrix $T_f$ is the matrix which converts the multi-dimensional external forces $F_s$ expressed in a Cartesian space, into data expressed in the articular space. $T_f = J_f^T T_c$, where $J_f$ is the Jacobian matrix of the robot connecting the Cartesian velocity of the center of the multi-axis force sensor 20 to the articular velocities of the robot 2 and $T_c$ is a matrix which is used for transforming the measurements of the multi-axis force sensor 20, initially expressed in the coordinates of the multi-axis force sensor, for expressing same in the coordinate system of the robot base. $J_f$ and $T_c$ are calculated from the articular positions $q_r$.

The articular conversion matrix $T_f$ and the weight of the effector $F_g$ are sent to the force and velocity loops 61.

In the first embodiment and as illustrated in FIG. 4, the articular conversion matrix $T_f$ and the weight of the effector $F_g$ are sent to the force and velocity loops 61 via a data frame 30 which comes from the central unit 5 which implements the gravity compensator 43 and the articular Cartesian converter 47. The force and velocity loops 61 are implemented by the auxiliary unit 7.

In the calculation of the control setpoints of the current loops $\tau_{cmd}$, the force and velocity control loop 61 calculate the articular force vector $\tau_s$ by subtracting the effector $F_g$ weight from the multi-dimensional external forces $F_s$ so as to disregard the effector weight and by applying the articular conversion matrix $T_f$ to the result, for converting same into the articular domain, as given in the following formula:

$$\tau_s = T_f(F_s - F_g) \quad \text{[Math 1]}$$

Alternatively, the force and velocity loops 61 can first apply the articular conversion matrix $T_f$ to the effector weight $F_g$ and to the multi-dimensional external forces $F_s$ and then perform the subtraction.

Figure 5:
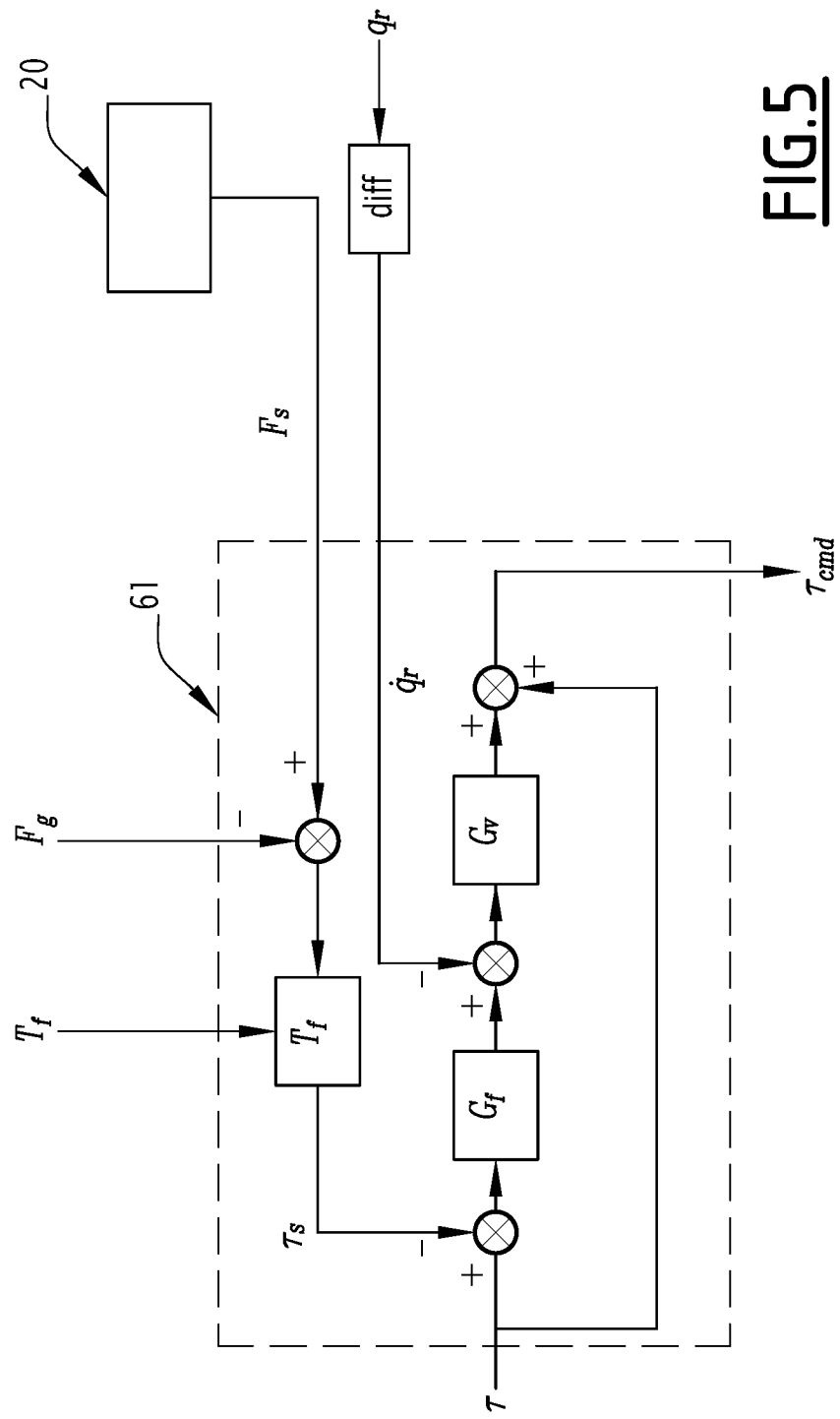
FIG. 5 is a functional diagram showing the details of the load and velocity loops.

According to an advantageous implementation illustrated in FIG. 5, the correction of the articular force setpoints τ, in the presence of a multi-axis force sensor 20, can be carried out by associating a compensation of gravity with two force and velocity correctors, denoted by $G_f$ and $G_v$, respectively, which correct the articular force setpoints provided to the robot arm 4. The force corrector $G_f$ e.g. is an integral controller, and the velocity corrector $G_v$ is a proportional controller.

In the first embodiment of the invention, the gravity compensator 43 and the articular Cartesian converter 47 are implemented in the central unit 5. The articular conversion matrix $T_f$ and the weight of the effector $F_g$ are sent by the link bus 18 to the force and velocity loops 61 which are implemented in the auxiliary unit 7.

Such implementation is advantageous because same allows all the calculations implemented in the auxiliary unit 7 to be carried out in articular coordinates. Such calculations are relatively simple (unlike the calculations made in the modules 43, 47, and 46). In this way, the impedance controller 48 and the force and velocity loops 61 can be calculated at a higher frequency. Moreover, many known solutions require the force measured by the multi-axis force sensor 20 to be returned to the central unit so that the latter calculates position, velocity or force setpoints, which are intended for controlling the actuators, thus leading to more delay in the force control loop, which results in lower accuracy and lower performance when the robot has to be guided, at least in part, manually.

As can be seen on FIG. 3, the articular impedance controller 48 comprises resolution module 70 and a display module 64. The resolution module 70 is configured for calculating the articular force setpoints τ and for sending the calculated articular force setpoints τ to the axis controller module 12. Such calculation is performed according to the previously calculated composite setpoint u, the previously calculated behavior matrix Y, the measured articular positions $q_r$, the articular velocities $\dot{q}_r$ derived from the measured articular positions and the previously calculated internal state $q_{mv}$.

In particular, the articular force setpoint τ used for controlling the axis controller module 12 is calculated from a control function which controls the difference between the articular position $q_r$ and the internal state $q_{mv}$ (previously defined with reference to the articular impedance controller 48).

The resolution module 70 calculates the derivative $\dot{q}_{mv}$ of the internal state according to the previously calculated composite setpoint u, the previously calculated behavior matrix Y, the articular position $q_r$, the articular velocities $\dot{q}_r$ and the previously calculated internal state $q_{mv}$. The integration module 64 determines the internal state $q_{mv}$ by integrating the time derivative $\dot{q}_{mv}$ of the internal state. The resolution module 70 e.g. uses the value of the internal state $q_{mv}$ already known from a previous calculation cycle, and stored in memory.

Preferentially, the control function is a proportional-integral-derivative controller (PID controller).

Advantageously, the articular force setpoint τ and the time derivative $\dot{q}_{mv}$ of the internal state are solutions of the following system of differential equations:

$$\begin{cases} \dot{q}_{mv} = u - Y\left(K_p(q_{mv} - q_r) + K_i \int (q_{mv} - q_r)dt - K_d\dot{q}_r\right) \\ \tau = K_p(q_{mv} - q_r) + K_i \int (q_{mv} - q_r)dt + K_d(\dot{q}_{mv} - \dot{q}_r) \end{cases}$$ [Math 2]

where $q_{mv}$ is the function corresponding to said internal state, $\dot{q}_{mv}$ is the time derivative of the internal state $q_{mv}$, τ is the articular force setpoint, herein presented in the form of a vector, Y is the behavior matrix and u is said composite setpoint.

In the equations, Kp, Ki, and Kd are gain matrices. In practice, the gains Kp, Ki and Kd are the gains used to set the parameters of the PID controller. Kp, Ki, and Kd e.g. correspond to proportional, integral, and derivative gains, respectively. Kp and Ki can be zero matrices if appropriate.

In such system e.g., the second equation performs a proportional integral derivative (PID) servo-control of the articular position of the robot $q_r$ on the position $q_{mv}$. The first equation defines the change of the virtual position represented by the internal state $q_{mv}$.

According to a first example of implementation, the articular impedance control can be performed by a controller satisfying the following system of equations:

$$\begin{cases} \gamma = K_p(q_{mv} - q_r) + K_i \int (q_{mv} - q_r)dt - K_d\dot{q}_r \\ \dot{q}_{mv} = u - Y\gamma \\ \tau = \gamma + K_d\dot{q}_{mv} \end{cases}$$ [Math 3]

where γ is an intermediate variable used to calculate the behavior matrix Y, the intermediate variable γ being calculated from the internal state $q_{mv}$, the articular position $q_r$ and the articular velocity $\dot{q}_r$.

The first implementation of the impedance controller is particularly advantageous within the framework of the first embodiment (FIGS. 1 and 2) because the behavior matrix Y is symmetrical, so that only some of the coefficient needs to be sent on the data bus 18, which further reduces the calculation time.

According to a second implementation example, the articular impedance control can be performed by a controller satisfying the following system of equations:

$$\begin{cases} \gamma = \left(K_p(q_{mv} - q_r) + K_i \int (q_{mv} - q_r)dt\right) - K_d\dot{q}_r \\ \dot{q}_{mv} = u + K_d^{-1}(P - I)\gamma \\ \tau = P\gamma + K_d u \end{cases}$$ [Math 4]

where γ is the intermediate variable described hereinabove, and P is a behavior matrix analogous to the behavior matrix Y, the matrix P being defined from the matrix Y by the following formula:

$$Y = K_d^{-1}(I - P)$$ [Math 5]

wherein "I" represents the identity matrix.

In both implementations of the impedance controller, other types of servo-control than PID servo-control can be used. e.g., the intermediate variable γ can be defined as follows, which corresponds to the application of a digital filter $e_f$ on the difference between the articular position $q_r$ and the internal state $q_{mv}$:

$$\gamma = e_f - K_d\dot{q}_r$$ [Math 6]

where the filter is given by the following formula:

$$e_f = F(p)(q_{mv} - q_r)$$ [Math 7]

where F(p) represents a Laplace transform and "p" is the Laplace variable.

Examples of operation of the articular impedance control in different modes of operation of the robot 2 will now be described.

In a first operating mode, the robot 2 works under automatic control. The robot arm 4 is servo-controlled with regard to position and has to follow the articular trajectory generated (e.g. generated by the module 44) independently of the external forces exerted on the robot arm 4. The trajectory is e.g. defined by a time-dependent articular position $q_d$ and the derivative $\dot{q}_d$ thereof.

In such case, the impedance manager 48 defines a zero behavior matrix Y, i.e. the coefficients of the behavior matrix Y are all zero. Alternatively, the above corresponds to defining P equal to the identity matrix in the second implementation of the impedance controller described hereinabove.

The impedance manager 48 also requires the composite setpoint u to have the following form:

$$u = \dot{q}_d + \frac{1}{T}(q_d - q_{mv}) \quad \text{[Math 8]}$$

where the parameter T is a time constant which has a strictly positive value.

In such case, the system of differential equations satisfied by the control system can be rewritten as follows:

$$\begin{cases} (q_d - q_{mv}) + T(\dot{q}_{mv} - \dot{q}_d) = 0 \\ \tau = K_p(q_{mv} - q_r) + K_i \int (q_{mv} - q_r)dt + K_d(\dot{q}_{mv} - \dot{q}_r) \end{cases} \quad \text{[Math 9]}$$

Thereby, the angular position $q_r$ is servo-controlled by the virtual position $q_{mv}$ and will follow the trajectory defined by the articular position $q_d$ after a transient regime the duration of which is determined by the time constant T, and with an accuracy which will depend on the values chosen for the gains $K_p$, $K_i$ and $K_d$.

The internal state $q_{mv}$ follows the velocity setpoints defined in the composite setpoint u in all articular directions.

In a second mode of operation, the robot 2 works under manual control. It could be desired e.g. to control the articular forces of the robot so that same follow a predetermined articular setpoint $\tau_d$ provided by the trajectory generator 44. If the setpoint is specified by a force screw $f_d$ applied at a point on the robot, then the equivalent articular setpoint is given by the following formula:

$$\tau_d = J^T f_d \quad \text{[Math 10]}$$

Where J denotes the Jacobian matrix of the robot corresponding to the point of application of the force and the exponent "T" denotes the transpose of the matrix.

Such an operating mode is useful e.g. when it is desired to leave the robot arm free to allow a user to control the robot arm entirely by a simple manual movement.

In such case, the impedance manager 46 defines the behavior matrix $Y = K_d^{-1}$ (or, equivalently, P=0 for the second implementation of the impedance controller) and the composite setpoint $u = K_d^{-1} \tau_d$.

The system of differential equations satisfied by the control system can be rewritten as follows:

$$\begin{cases} K_d(\dot{q}_{mv} - \dot{q}_r) + K_p(q_{mv} - q_r) + K_i \int (q_r - q_{mv})dt = \tau_d \\ \tau = \tau_d \end{cases} \quad \text{[Math 11]}$$

In practice, the first equation implies that the difference between the internal state $q_{mv}$ and the angular position $q_r$ converges towards zero when the predetermined articular setpoint $\tau_d$ is constant.

In practice, the gains of the PID controller have sufficiently high values to approximate that the internal state $q_{mv}$ is equal to the actual angular position $q_r$, even when the predetermined articular setpoint $\tau_d$ is not constant. In other words, the internal state $q_{mv}$ follows the measured articular positions $q_r$ of the robot arm 4 in all articular directions.

The second equation shows that the articular force setpoint sent to the robot arm 4 corresponds to the predetermined articular setpoint $\tau_d$, independently of the position of the robot arm 4.

In a third mode of operation, the robot 2 operates in a hybrid mode combining both force control and position control. The robot arm 4 has to follow a predefined trajectory while applying controlled forces in certain directions.

Such a mode of operation is useful e.g. when it is desired to be able to guide the robot arm by hand ("handguiding") while following a predefined trajectory. In particular, it is possible in this way to lock certain degrees of freedom of the robot arm 4, e.g.:

- by authorizing only manual guiding of the robot arm 4 in translation or in rotation,
- or by locking the end of the robot arm 4 in a fixed position while releasing the articulation of the segments of the robot arm,
- or alternatively by leaving the end of the robot arm 4 free but locking all or part of the articulations of the robot arm 4.

To perform such locking, all or some of the actuators M1 to M6 exert a force which opposes the manual force exerted by the user.

Such a mode of operation may also be useful when the robot is used in an industrial process for shaping a mechanical part by means of an effector 6 carried by the robot arm 4, during which the effector 6 comes into direct contact with the mechanical part, e.g. during sanding, deburring, assembly, or contour following of the part, and many other examples.

Finally, such an operating mode can be useful when the robot arm is controlled remotely with a force feedback, or when a plurality of industrial robots have to collaborate for manipulating the same object, e.g. during a process of manufacturing a mechanical part.

A first example of the hybrid mode of operation can relate to operation with a "ball articular" constraint, wherein it is desired that the end of the robot remains at a given point ($x_d$, $y_d$, $z_d$), the orientation being free. Moreover, it is desired to be able to freely move the orientation of the end of the robot arm, and thus the moments ($m_x$, $m_y$, $m_z$) around the point of rotation have to remain zero.

In such case, the impedance manager 46 calculates the behavior matrix Y and the composite setpoint u as follows:

$$c = \begin{pmatrix} x(q_{mv}) - x_d \\ y(q_{mv}) - y_d \\ z(q_{mv}) - z_d \end{pmatrix}, \quad G_f = J_{mv}^T \begin{pmatrix} 1 & 0 & 0 \\ 0 & 1 & 0 \\ 0 & 0 & 1 \\ 0 & 0 & 0 \\ 0 & 0 & 0 \\ 0 & 0 & 0 \end{pmatrix}, \quad \text{[Math 12]}$$

$$Y = K_d^{-1} - K_d^{-1} G_f (G_f^T K_d^{-1} G_f)^{-1} G_f^T K_d^{-1}$$

$$(\text{ou } P = G_f (G_f^T K_d^{-1} G_f)^{-1} G_f^T K_d^{-1} \text{ for the second implementation})$$

$$u = -\frac{1}{T} K_d^{-1} G_f (G_f^T K_d^{-1} G_f)^{-1} c$$

where $J_{mv}$ denotes the Jacobian matrix of the robot calculated from the internal state $$q_{mv} \text{ and } \begin{pmatrix} x(q_{mv}) \\ y(q_{mv}) \\ z(q_{mv}) \end{pmatrix}$$

is the Cartesian position corresponding to the internal state $q_{mv}$.

The internal state $q_{mv}$ follows the articular positions $q_r$ measured in all the force-controlled directions defined by the behavior matrix Y, i.e. along the directions corresponding to the change of orientation of the end of the robot. On the other hand, the internal state $q_{mv}$ follows the velocity setpoints defined in the composite setpoint u in the velocity-controlled directions defined by the behavior matrix Y, i.e. in the directions corresponding to the translation of the end of the robot.

A second example of the hybrid mode of operation will now be described. In such mode of operation, the robot follows a trajectory in a plane (x,y), with a fixed orientation. Along the z direction orthogonal to the (x,y) plane, the robot applies a time-dependent force. Such hybrid mode of operation can be useful e.g. for sanding a surface e.g. In a fully automatic operation.

In the second hybrid mode of operation, the trajectory generator 44 generates the setpoints $x_d(t)$ and $y_d(t)$, which define the desired trajectory in the plane (x,y), as well as the value $f_{z,d}(t)$ of the desired force along the direction z, and sends same to the impedance manager 46.

The impedance manager 46 calculates the behavior matrix Y and the composite setpoint u as follows:

[Math 13]

$$c = \begin{pmatrix} x(q_{mv}) - x_d(t) \\ y(q_{mv}) - y_d(t) \\ r_x(q_{mv}) \\ r_y(q_{mv}) \\ r_z(q_{mv}) \end{pmatrix}, G_f = J_{mv}^T \begin{pmatrix} 1 & 0 & 0 & 0 & 0 \\ 0 & 1 & 0 & 0 & 0 \\ 0 & 0 & 0 & 0 & 0 \\ 0 & 0 & 1 & 0 & 0 \\ 0 & 0 & 0 & 1 & 0 \\ 0 & 0 & 0 & 0 & 1 \end{pmatrix},$$

$$Y = K_d^{-1} - K_d^{-1} G_f (G_f^T K_d^{-1} G_f)^{-1} G_f^T K_d^{-1}$$

$$\left( \text{or } P = G_f (G_f^T K_d^{-1} G_f)^{-1} G_f^T K_d^{-1} \text{ for the second implementation} \right)$$

$$u = K_d^{-1} G_f (G_f^T K_d^{-1} G_f)^{-1} \left( \begin{pmatrix} \dot{x}_d(t) \\ \dot{y}_d(t) \\ 0 \\ 0 \\ 0 \end{pmatrix} - \frac{1}{T} c \right) + Y J_{mv}^T \begin{pmatrix} 0 \\ 0 \\ f_{z,d}(t) \\ 0 \\ 0 \\ 0 \end{pmatrix}$$

where $J_{mv}$ denotes the Jacobian matrix of the robot calculated from the internal state, $q_{mv}$, $x(q_{mv})$ and $y(q_{mv})$ are the coordinates in the (x,y) plane of the Cartesian position of the terminal component corresponding to the internal state $q_{mv}$, and $r_x(q_{mv})$, $r_y(q_{mv})$, $r_z(q_{mv})$ represent the angular coordinates of the terminal component, corresponding to the internal state $q_{mv}$.

The internal state $q_{mv}$ follows the articular positions $q_r$ measured along all the force-controlled directions defined by the behavior matrix Y, i.e. along the articular direction corresponding to the direction z. On the other hand, the internal state $q_{mv}$ follows the velocity setpoints defined in the composite setpoint u in the velocity-controlled directions defined by the behavior matrix Y, i.e. in all the other articular directions.

In the three modes of operation described, the internal state $q_{mv}$ follows the articular positions $q_r$ measured along the force-controlled directions defined by the behavior matrix Y and follows the velocity setpoints defined in the composite setpoint u along the velocity-controlled directions defined by the behavior matrix Y.

In an "impedance control" fourth mode of operation, the robot has to behave as if the robot were connected to a point along a trajectory $p_d$ by means of a spring $K_{cart}$ and a damper $B_{cart}$. The vector $p_d$ contains the Cartesian coordinates (position and orientation) of the trajectory. The associated velocity is denoted by $v_d$.

In such case, the impedance manager 46 calculates the behavior matrix Y and the composite setpoint u as follows:

$$u(K_d + J_{mv}^T B_{cart} J_{mv})^{-1} J_{mv}^T (K_{cart}(xp_d - p_{mv}) + B_{cart} v_d) Y = (K_d + J_{mv}^T B_{cart} J_{mv})^{-1}$$

wherein $xp_{mv}$ is a vector of the Cartesian coordinates (position and orientation) calculated from the internal state $q_{mv}$ and the geometric model of the robot. The characteristics e.g. of the spring $K_{cart}$ and of the damper $B_{cart}$ are given herein in the form of matrices.

For all the operating modes described, the impedance manager 46 generates the behavior matrix Y and the composite setpoint u according to the controls received from the application program execution module 42 and from the trajectory generator 44.

Returning to FIGS. 1, 2 and 3, aspects of the implementation of impedance control by the control system 8 will now be described.

As explained hereinabove, the application program execution module 42, the trajectory generator 44 and the impedance manager 46 are advantageously implemented by the central processing unit 5.

The articular impedance controller 48 and the axis controller module 12 are preferentially implemented by the auxiliary unit 7.

In a variant, and in particular in the case where amplifiers are used, e.g. like in the implementation shown in FIGS. 7 and 8, then the articular impedance controller 48 and the force and velocity loops 61 are implemented by the central unit 5'.

The calculations needed for implementing impedance control are performed periodically over time.

In a particularly advantageous manner, the central processing unit 5 is configured for periodically recalculating the composite setpoint u and the behavior matrix Y with a first calculation frequency, denoted by F1.

The articular force setpoints T are recalculated periodically with a second calculation frequency, denoted by F2, which is higher than the first frequency F1.

The second frequency F2 is e.g. between two and twenty times higher than the first frequency F1. Preferentially, the second frequency F2 is between five and ten times higher than the first frequency F1. Also preferentially, the second frequency F2 is eight times higher than the first frequency F1.

The above is particularly advantageous when the articular impedance controller 48 is implemented by the auxiliary unit 7.

Indeed, the articular impedance controller 48 only needs to use a relatively limited number of simple arithmetic operations. Same can thus operate at high frequency. In this way it is possible to have high gains Kp, Ki and Kd, which can be used for obtaining a good stiffness and a good precision along the position-controlled directions. The more complex geometric calculations are implemented in the central unit 5.

Moreover, implementing impedance control in the auxiliary controller 7 separately from the central unit 5, provides a performance gain because a single processor then controls the different actuators M1 to M6. By being as close as possible to the sensors and actuators, in this way it is possible to have reduced delays in the servo-controls, and thus to obtain better performance in the end. Implementing impedance control and the axis controller module 12 in a single processor of the auxiliary unit 7 increases performance because there is no communication delay.

According to an example given for illustrative purposes, the composite setpoints u and the behavior matrices Y are calculated by the central unit 5 and transferred to the auxiliary unit 7 every millisecond, i.e. with a frequency of 1000 Hz. Each of the components of such controls are then linearly interpolated for obtaining values for each of the calculation cycles performed with the second frequency F2, e.g. with a frequency of 8 kHz.

More generally, another advantageous aspect of the implementation of the invention lies in the fact that the servo-control loop and the integration of the internal state $q_{mv}$ are both performed in the articular coordinates. In this way, there is no need to implement geometric transformations that are costly in terms of computational resources. Reducing the time required to perform the calculations related to impedance control during each calculation cycle also leads to higher gains Kp, Ki, Kd, and thus to obtaining better accuracy, in particular along the position-controlled directions.

The impedance control process can be used for operating effectively whatever the operating mode chosen, whether the robot is operating in force-controlled mode, or in a position-controlled mode, or in a hybrid mode or in an impedance-controlled mode. The values of the gain coefficients Kp, Ki and Kd can be set once and for all, independently of the operating mode.

By means of to the invention, the guiding of the robot is improved when the robot has to be guided, at least partially, by hand.

Certain embodiments can be implemented independently of the other embodiments.

Figure 6:
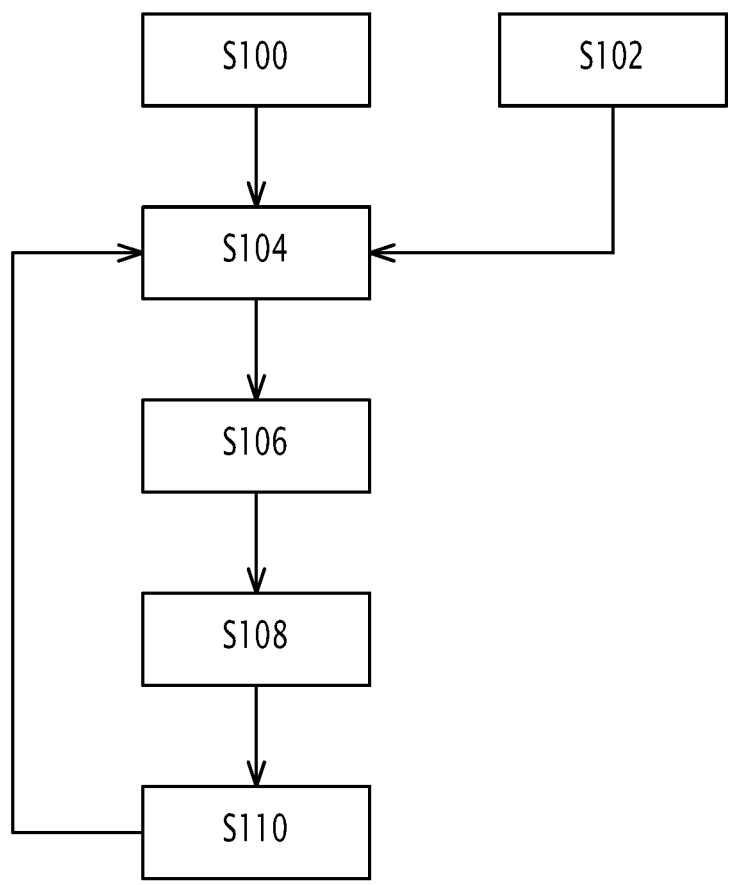
FIG. 6 schematically shows a process for controlling an industrial robot according to embodiments of the invention.

FIG. 6 shows a schematic example of implementation of an operation process according to the invention. In a variant, the steps could be executed in a different order. Some steps could be omitted. The example described does not prevent other steps from being implemented jointly and/or sequentially with the described steps, in other embodiments.

The process starts at step S100 e.g. with the launch of a robot control program, in particular in a force or hybrid control mode. During such step, depending on the mode of operation chosen, a trajectory can be acquired or defined by the control system 8.

In parallel, a user can, during a step S102, manipulate the robot arm 4, so as to impose a force or a motion by hand.

During a step S104, the control system 8 calculates the composite setpoint u defining articular forces and velocities, according to the target trajectory and to the operating mode.

During a step S106, the control system 8 calculates the behavior matrix Y according to the operating mode.

During a step S108, the control system 8 calculates the articular force setpoint τ and the time derivative $\dot{q}_{mv}$ of said internal state $q_{mv}$ the calculation being performed according to said previously calculated composite setpoint u, the previously calculated behavior matrix Y, the measured articular positions $q_r$, articular velocities $\dot{q}_r$ derived from the measured articular positions, and the previously calculated internal state.

As previously expressed, the articular force setpoint τ for controlling the axis controller module 12 is calculated from a control function which adjusts the difference between the articular position $q_r$ and the internal state $q_{mv}$ (previously defined with reference to said time derivative $\dot{q}_{mv}$ of the internal state $q_{mv}$ During the step S110, the control system 8 calculates the control setpoints of the power units 15 according to the articular force setpoint τ.

Advantageously, when calculating the control setpoints for the power units 15, an external force applied to the robot is taken into account, e.g. by a user exerting a manual force on the robot arm 4.

The invention has been described with a robot arm articulated for performing rotations. The invention is applicable to a robot comprising elements in translation with respect to each other, along one or a plurality of axes of motion.

The aforementioned embodiments and variants can be combined with each other so as to generate new embodiments.

The invention claimed is:

1. A control process for an industrial robot, the industrial robot comprising:
   a multi-axis robot arm comprising at least two electric actuators each configured to move one part of the multi-axis robot arm with respect to another part of the multi-axis robot arm about or along an axis of movement, each electric actuator being associated with a sensor configured for measuring an articular position of the associated electric actuator,
   a robot control system comprising an axis controller module configured for calculating control setpoints of power units which deliver an appropriate electric current to the electric actuators according to an articular force setpoint and a calculation module configured for determining articular force setpoints for the axis controller module, the calculation module being coupled to the axis controller module,
   wherein the control process comprises:
   calculating a composite setpoint, the composite setpoint being time-dependent and defining articular forces and/or velocities, according to a target trajectory and to an operating mode,
   calculating a behavior matrix which describes a desired behavior of the multi-axis robot arm, the behavior matrix defining directions along which the calculated composite setpoint is to be applied, the behavior matrix being expressed in articular space,
   calculating an articular force setpoint for controlling the axis controller module and calculating a time derivative of an internal state, the internal state corresponding to an articular position and being distinct from the measured articular positions,
   command the multi-axis robot arm using the articular force setpoint,
   wherein the calculation of the articular force setpoint for controlling the axis controller module and said calculation of the time derivative each being a function of: the composite setpoint, the behavior matrix, the measured articular positions, articular velocities derived from the measured articular positions, and a previous internal state previously calculated in a preceding calculation cycle,
   wherein the articular force setpoint for controlling the axis controller module is calculated by applying a control function which adjusts a difference between the articular position and the internal state, the internal state being determined by integration of said time derivative of the internal state.

2. The control process according to claim 1, wherein the control function is a proportional-integral-derivative controller.

3. The control process according to claim 2, wherein the articular force setpoint and the time derivative of the internal state are solutions of the following system of differential equations:

$$\begin{cases} \dot{q}_{mv} = u - Y\left(K_p(q_{mv} - q_r) + K_i \int (q_{mv} - q_r)dt - K_d \dot{q}_r\right) \\ \tau = K_p(q_{mv} - q_r) + K_i \int (q_{mv} - q_r)dt + K_d(\dot{q}_{mv} - \dot{q}_r) \end{cases}$$

where $q_{mv}$ is the function corresponding to said internal state, $\dot{q}_{mv}$ is the time derivative of the internal state $q_{mv}$, $\tau$ is the articular force setpoint, Y is the behavior matrix, $q_r$ is the articular position, $\dot{q}_r$ is the time derivative of the articular position, and u is said composite setpoint, and where Kp, Ki, and Kd are gain matrices.

4. The control process according to claim 1, wherein the electric actuators include brushless electric motors and wherein the axis controller module is configured for calculating a supply current of the at least two electric actuators according to the articular position thereof measured by an associated sensor.

5. The control process according to claim 1, wherein the axis controller module takes into account the multi-dimensional external forces measured by a multi-axis force sensor for calculating the control setpoints of the power units.

6. The control process according to claim 5, wherein the industrial robot comprises an effector placed at an end of the multi-axis robot arm, wherein the calculation module comprises a gravity compensator which calculates a weight of the effector, and a Cartesian articular converter which calculates a conversion matrix from the measured articular positions and sends the weight of the effector and the conversion matrix to the axis controller module for taking into account the multi-dimensional external forces measured by the multi-axis force sensor which is mounted at the end of the multi-axis robot arm.

7. The control process according to claim 6, wherein the calculation module calculates the composite setpoint and the behavior matrix with a first frequency and calculates the articular force setpoint for controlling the axis controller module with a second frequency higher than the first frequency.

8. The control process according to claim 7, wherein the second frequency is between two and twenty times higher than the first frequency.

9. The control process according to claim 7, wherein the calculation module comprises a gravity compensator which calculates the weight of the effector and a Cartesian articular converter which calculates the conversion matrix from the articular positions and sends to the axis controller module, at the first frequency, the weight of the effector and the articular conversion matrix for taking into account multi-dimensional external forces by means of a multi-axis force sensor mounted at the end of the multi-axis robot arm.

10. The control process according to claim 1, wherein a central unit implements the calculation of the composite setpoint and of the behavior matrix and wherein an auxiliary unit implements the calculation of the articular force setpoints and the axis controller module, the central unit and the auxiliary unit being in communication by means of a data bus.

11. The control process according to claim 1, wherein the at least two electric actuators include brushless electric motors and wherein a central unit implements the calculation of the composite setpoint and of the behavior matrix, the calculation of the articular force setpoints, and the calculation of control setpoints of current loops by force and velocity loops, and wherein a plurality of amplifiers in communication with the central unit are configured to supply current to the motors according to control setpoints of the current loops.

12. The control process according to claim 1, wherein the calculation of the composite setpoint and the behavior matrix takes into account the internal state.

13. An industrial robot control system for controlling an industrial robot comprising:

a multi-axis robot arm comprising at least two electric actuators each configured to move one part of the multi-axis robot arm with respect to another part of the multi-axis robot arm about or along an axis of movement, each electric actuator being associated with a sensor configured for measuring an articular position of the associated electric actuator, a robot control system comprising an axis controller module configured for calculating control setpoints of power units which deliver an appropriate electric current to the electric actuators according to an articular force setpoint and a calculation module configured for determining articular force setpoints for the axis controller module, the calculation module being coupled to the axis controller module, the control system comprising modules configured for:

calculating a composite setpoint which is time-dependent and which defines articular forces and/or velocities, according to a target trajectory and to an operating mode, calculating a behavior matrix which describes a desired behavior of the multi-axis robot arm, defining directions along which the calculated composite setpoint is to be applied, the behavior matrix being expressed in articular space, calculating an articular force setpoint for controlling the axis controller module and calculating a time derivative of an internal state, said internal state corresponding to an articular position and being distinct from measured articular positions, the calculation of the articular force setpoint for controlling the axis controller module and the calculation of the time derivative each being carried out in function of: the composite setpoint, the behavior matrix, the measured articular positions, articular velocities derived from the measured articular positions, and a previous internal state previously calculated in a preceding calculation cycle, command the multi-axis robot arm using the articular force setpoint, wherein the articular force setpoint for controlling the axis controller module is calculated by applying a control function which adjusts a difference between the articular position and the internal state, the internal state being determined by integrating said time derivative of the internal state.

14. An industrial robot comprising a control system according to claim 13.

15. The control process according to claim 7, wherein the second frequency is between five and ten times higher than the first frequency.

16. The control process according to claim 7, wherein the second frequency is eight times higher than the first frequency.

\* \* \* \* \*